US005778324A

United States Patent [19]

Smith

[11] Patent Number: 5,778,324

[45] Date of Patent: Jul. 7, 1998

[54] ANTENNA DOWNLINK BEAMSTEERING ARRANGEMENT

[75] Inventor: Martin Stevens Smith, Chelmsford, United Kingdom

[73] Assignee: Northern Telecom Limited, Montreal, Canada

[21] Appl. No.: 677,284

[22] Filed: Jul. 9, 1996

[30] Foreign Application Priority Data

Jul. 18, 1995 [GB] United Kingdom .................... 9514659

[51] Int. Cl.[6] ................................ H04B 1/14; H01Q 1/12

[52] U.S. Cl. ............................................ 455/562; 343/892

[58] Field of Search ..................................... 455/422, 507, 455/517, 561, 562, 67.1, 63, 277.1, 277.2, 278.1; 343/700 MS, 893

[56] References Cited

U.S. PATENT DOCUMENTS 4,104,641 8/1978 Unz .

5,260,968 11/1993 Gardner et al. .

FOREIGN PATENT DOCUMENTS 0 374 008 A1 12/1989 European Pat. Off. .

0 595 247 A1 10/1993 European Pat. Off. .

2 266 998 5/1996 United Kingdom .

WO 94/09568 4/1996 WIPO .

*Primary Examiner*—Amelia Au

*Attorney, Agent, or Firm*—John D. Crane

[57] ABSTRACT

A base station arrangement including an antenna array is disclosed, wherein the uplink signals are weighted with complex array weights and the downlink signals are steered, wherein the downlink signals are steered using data from directional information derived from the uplink signals. A method of operation is also disclosed.

11 Claims, 3 Drawing Sheets

A signal transmitted from the mobile reaches the basestation having travelled via a number of paths which exist as a result of scattering from obstacles randomly distributed on a circle surrounding the mobile.

ANTENNA DOWNLINK BEAMSTEERING ARRANGEMENT

FIELD OF THE INVENTION

This invention relates to cellular radio communication systems and in particular relates to an antenna downlink beamsteering arrangement.

BACKGROUND ART

Cellular radio systems are currently in widespread use throughout the world providing telecommunications to mobile users. In order to meet the capacity demand, within the available frequency band allocation, cellular radio systems divide a geographic area to be covered into cells. At the centre of each cell, there is a base station through which the mobile stations communicate, each base station typically being equipped with antenna arrays arranged sectors. Configurations of three or six sectors (sub-cells) are often employed, where the higher gain of correspondingly narrower beamwidth antennas improve the uplink from the lower power mobiles. The distance between the cells is determined such that co-channel interference is maintained at a tolerable level.

Obstacles in a signal path, such as buildings in built-up areas and hills in rural areas, act as signal scatterers and can cause signalling problems. These scattered signals interact and their resultant signal at a receiving antenna is subject to deep and rapid fading and the signal envelope often follows a Rayleigh distribution over short distances, especially in heavily cluttered regions. A receiver moving through this spatially varying field experiences a fading rate which is proportional to its speed and the frequency of the transmission. Since the various components arrive from different directions, there is also a Doppler spread in the received spectrum.

When a new cellular radio system is initially deployed, operators are often interested in maximising the uplink (mobile to base station) and downlink (base station to mobile station) range. The ranges in many systems are uplink limited due to the relatively low transmitted power levels of hand portable mobile stations. Any increase in range means that fewer cells are required to cover a given geographic area, hence reducing the number of base stations and associated infrastructure costs.

The range of the link, either the uplink or the downlink, can be controlled principally in two different ways: by adjusting either the power of the transmitter or the gain at the receiver. On the downlink the most obvious way of increasing the range is to increase the power of the base station transmitter. To balance the link the range of the uplink must also be increased by an equivalent amount. The output power of a transmitter on a mobile, however, is constrained to quite a low level to meet national regulations, which vary on a country to country basis. Accordingly the receive gain at the base station must be increased.

The principal method of improving the receive system gain and to reduce the effect of fading is to include some form of diversity gain in addition to the receive antenna gain. The object of a diverse system is to provide the receiver with more than one path, with the paths being differentiated from each other by some means, e.g. space, angle, frequency or polarisation. The use of these additional paths by the receiver provides the diversity gain. The amount of gain achieved depends upon the type of diversity, number of paths, and method of combination.

This invention is concerned with spatially diverse systems and in particular seeks to provide an arrangement wherein downlink performance is improved.

Cellular radio base stations frequently use two antennas for diversity reception on the uplink, spaced by many (e.g. 20) wavelengths. This large spacing is required because the angular spread of the incoming signals is narrow. This can be represented as a ring of scatterers around a mobile user who is transmitting to a base station otherwise known as the uplink path and such an arrangement is shown in FIG. 1. For example the radius of scatterers may be 50 to 100 metres, and the range to the base station may be up to 10 km, resulting in a narrow angular spread. A large antenna spacing is required at the basestation to provide decorrelated fading, which can be calculated from the Fourier transform relationship between antenna array aperture and angular width (a large aperture in wavelengths provides a narrow beam).

In order to improve wanted signals and discriminate against interfering signals, antennas are being developed which utilise an array of antenna elements at the base station, allied with an "intelligent" beamformer. One such technique is to use a multichannel maximal ratio combiner on reception at the base station array. This operates by weighting the array signals si (i=1 to N, where N=the number of elements in the array) with their complex conjugates $s_i$* (assuming equal noise powers on each channel) and summing to give:

$$S=\sum_{i=1}^{N} s_i^* s_i=\sum_{i=1}^{N} |s_i|^2.$$

For a N element array, this provides both array gain (approximately a factor N in power) and diversity gain, the latter only if at least some of the array elements are widely spaced. Thus a factor N improvement in mean signal level can be achieved, allowing extended range or lower mobile transmit power. The array provides narrower beams than a single antenna element, and hence also provides better protection against interference, improving carrier to interference ratios and hence allowing higher capacity systems by reducing re-use factors. Swett (WO 94/09568) discloses such a system.

The limitation of the above is that the improvements are only for the uplink, and not for the downlink (base station transmit to the mobile). The present invention seeks to provide an improved downlink signal.

A standard feature of a number of cellular radio systems is that the sets of uplink and downlink frequencies are separated into two distinct bands spaced by a guard band, for example 1800–1850 MHz (uplink) and 1900–1950 MHz (downlink). Up- and down- link frequencies are then paired off, e.g. 1800 with 1900, 1850 with 1950. There is therefore a significant change of frequency (e.g. 5%) between up and down links. There is consequently no correlation for the fast fading (as the mobile moves) between up and down links.

SUMMARY OF THE INVENTION

In accordance with the present invention, there is provided a base station arrangement including an antenna array, wherein the uplink signals are weighted with complex array weights and wherein the downlink signals are steered using directional information derived from the uplink signals.

In accordance with another aspect of the present invention, common array elements are used for the uplink and downlink signals. Alternatively, only some of the antenna elements are employed for both the uplink and downlink signals. Separate arrays can be used for the up and down links, and in particular it may be preferable to have a closely spaced array for the downlink, with a less closely spaced array for the uplink.

In accordance with a still further aspect of the invention, there is provided a base station arrangement, wherein the antennas are arranged in two groups per facet, wherein a first group comprises a plurality of antenna arrays and a second group comprises a single antenna array. Alternatively, both group could comprise a plurality of antenna arrays.

In accordance with a still further aspect of the invention, there is provided a method of operating a base station arrangement, wherein incoming signals from a mobile radio are weighted with complex array weights, deriving directional information from these signals and applying the directional information to the downlink signals whereby a downlink beam is steered towards the mobile.

The method of combining the uplink signal can be performed by the use of maximal ratio combining, with the method of combining the downlink signal employing standard beam weights. Non-uniform array spacings can be used.

The present invention thus resides in the use of complex array weights for the uplink signals, deriving directional information from the uplink signals and using this data to steer the downlink beam.

DESCRIPTION OF THE DRAWINGS

In order that the invention may be more fully understood, reference will now be made to the figure as shown in the accompanying drawing sheets, wherein:

FIG. 2 shows the array gain for a four element array, where maximal ratio combining weights are used for the uplink and a standard beam (e.g. uniform amplitude array weights) are used for the downlink. The gain is shown as a function of array inter-element spacing. This figure shows gain averaged through the fast fading, and are for the case of a mobile positioned "broadside" to the array. The uplink gain rises above 6 dB (N=4) due to diversity gain (this part is dependent on the error rate). No diversity gain occurs on the downlink, as standard beam weights are used. Significant array gain is available on the downlink, provided the array spacing is not too large. It is then possible to select an array spacing such that array gain and significant diversity gain are available on the uplink, and there is still significant array gain for the downlink, for example with an array spacing of about 10 wavelengths for this scenario.

FIG. 3 shows the corresponding results for the case where the mobile position is moved to 30 degrees from broadside, and direction finding (d.f.) using the uplink signals has been employed to steer the downlink beam towards the mobile and its ring of scatterers. The resulting curve is similar to the broadside case, apart from a factor to allow for the projected aperture of the array.

Figure 1:
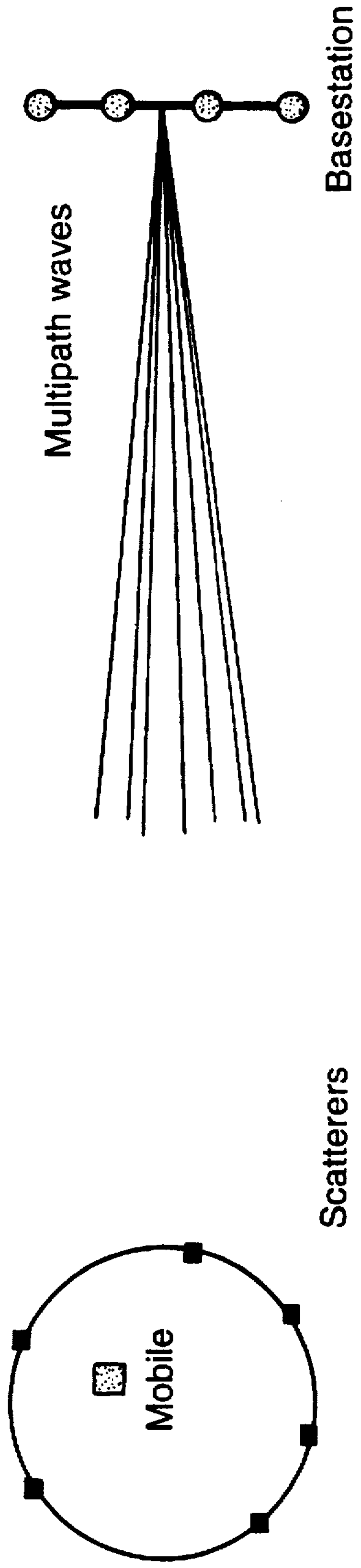
FIG. 1 shows a downlink signal scattering model
Figure 2:
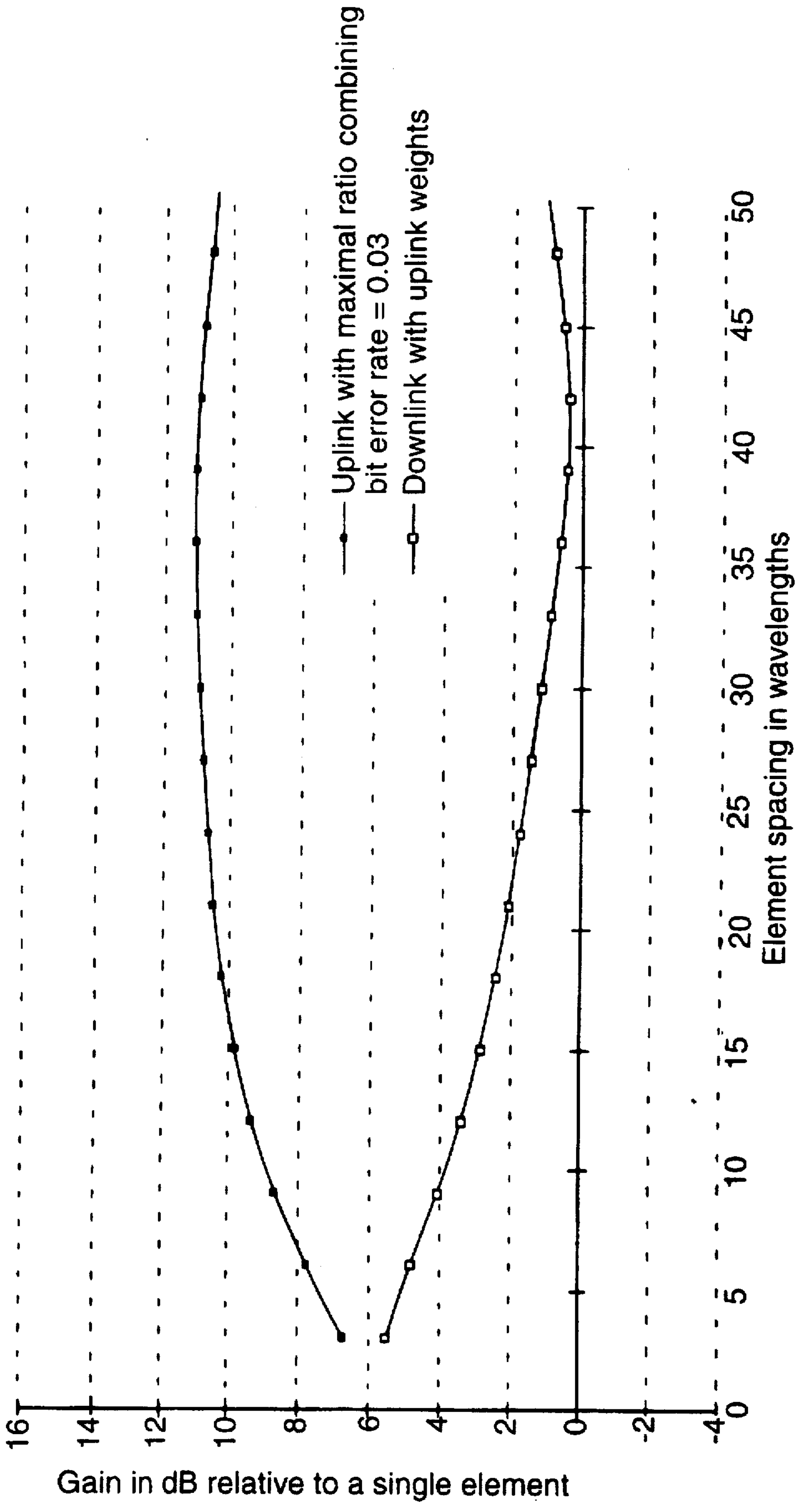
FIG. 2 is a graph detailing uplink and downlink gain versus antenna element spacing for a 4-element antenna array, with a mobile at broadside.
Figure 3:
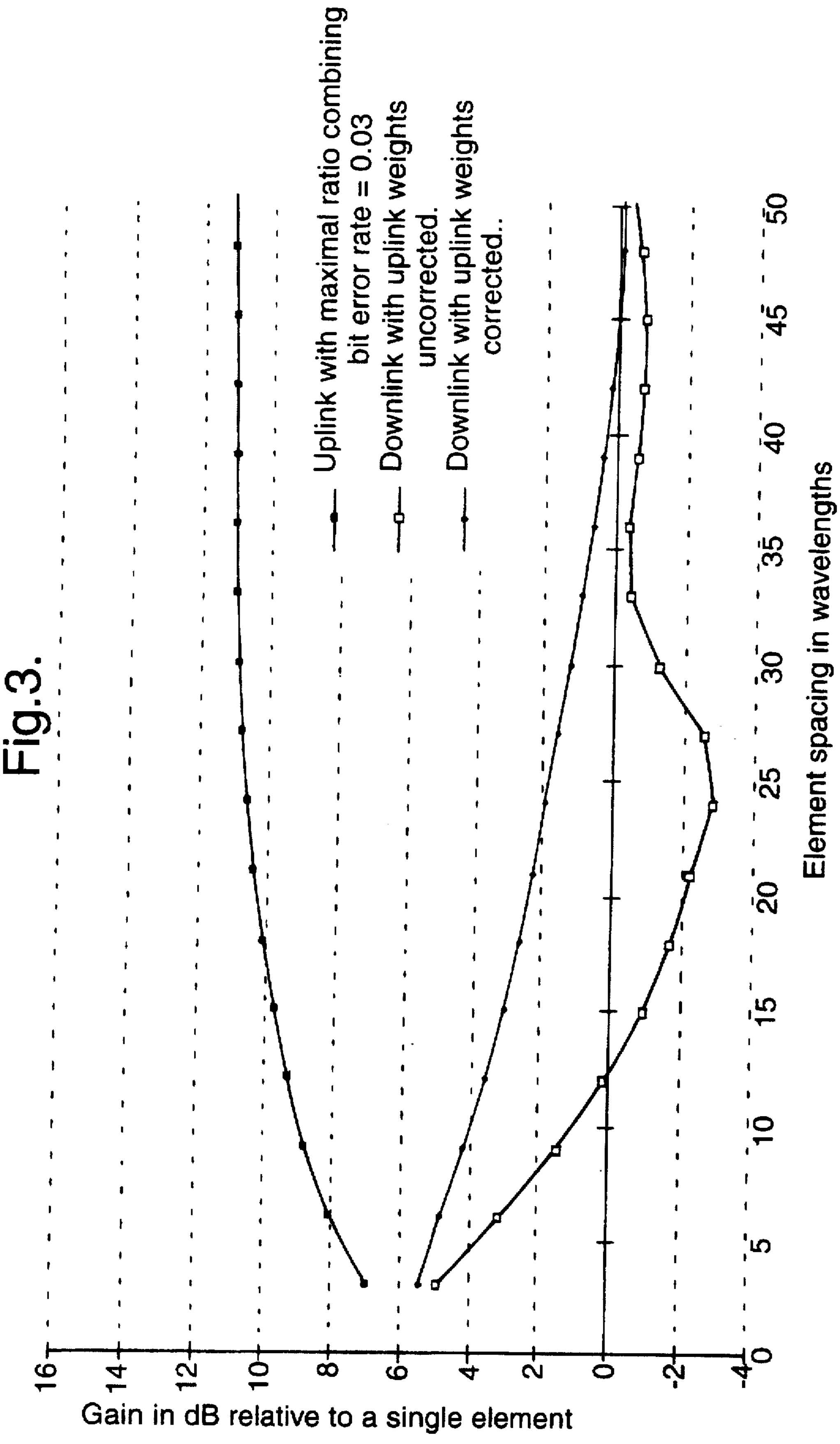
FIG. 3 is a graph detailing uplink and downlink gain versus antenna element spacing for a 4-element antenna array, with a mobile at 30° from broadside.

Two possible uplink/downlink scenarios arise from these results: Common array elements can be used with complex weights (e.g. maximal ratio combining weights) for the uplink and standard beam weights (uniform or tapered amplitude, phase slope to steer the beam) for the downlink. Alternatively, separate arrays can be used for up and down links, for example a closely spaced array can be employed for the downlink, to provide the maximum downlink gain (the left portion of the graphs in FIGS. 2 and 3), with a less closely spaced array being employed for the uplink, to provide maximum spatial diversity (the centre-right portions of the graphs in FIGS. 2 and 3). A combination of these two concepts is also possible, for example, if some elements are shared and non-uniform array spacings are used. Thus, complex array weights are employed for the uplink, the downlink beam is steered, with directional information being derived from the uplink signals.

There are various possible methods for deriving directional information from the uplink signals. One example is to use an array with a first group of closely spaced elements ($<1\lambda$), plus one or more antenna elements which are spaced from the first group of elements and can be considered as "outlier" elements with a wide spacing to the close spaced group, to achieve good spatial diversity gain for the uplink. The outlier elements may comprise a single linear array or comprise a second group of elements, conveniently the same type of array as the first group whereby uniformity of componentry may be maintained and reduce costs of manufacture and ease installation.

The first group of elements (and second if of a similar configuration) can be connected to a multiple beam former, such as a Butler matrix, which forms simultaneous multiple beams spanning the sector of interest. By detecting the relative amplitudes in the multiple beams, the angle of arrival of the uplink signal can be deduced, and this information used to derive the necessary phase slope to be applied to the close spaced array elements for the downlink signal. Uplink maximal ratio combining can be performed on the complex beam outputs plus the outlier element(s) output(s).

Since direction finding is facilitated with an array containing both small and large spacings, this array configuration is also usefully incorporated for the uplink.

There are four antenna columns on a typical cellular base station facet: on the uplink all four antenna columns are used and maximal ratio combining is carried out; on the downlink, rather than combining the outputs through four transmitters, the signals are fed through one antenna. The combining advantages are lost on the downlink since the antennas of a whole array are employed for each frequency. The present invention allows the burden of combining to be shared, where there is an outlier, whereby spatial diversity is obtained by spacing the antenna groups spaced apart. Signals do not have to be put through the transceiver transmitters of only one group of antennas of one facet: instead the signals can be split between the groups of antennas of the facet. This eases the combining load imposed on the antennas and beamformers. A further advantage lies in the reduced visual impact of a base station. Whilst there are two antenna groups per sector, which increases the number of elements liable to sreate a visual impact, the size of the antenna groups can be reduced whereby a smaller visual impact is created, provided that the antenna groups are sufficiently widely spaced apart.

I claim:

1. A cellular radio base station arrangement, comprising:

an antenna array, wherein the antenna array comprises a first group of antenna elements and a second group of antenna elements;

wherein the first group of antenna elements have a small interelement spacing of less than $1\lambda$;

wherein the second group of antenna elements are spaced from the first group of antenna elements with a large inter-group spacing greater than $1\lambda$; and means to weight received uplink signals with complex array weights and derive directional information, and means to steer downlink signals with the directional information derived from the uplink signals.

2. An arrangement according to claim 1 wherein common array elements are used for the uplink and downlink signals.

3. An arrangement according to claim 1 wherein some common antenna elements are employed for both the uplink and downlink signals.

4. An arrangement according to claim 1 wherein separate antenna elements are used for the uplink and downlink signals.

5. An arrangement according to claim 4 wherein a closely spaced array is employed for the downlink signal, with a less closely spaced array being employed for the uplink signal.

6. An arrangement according to claim 1 wherein the method of combining the uplink signal is maximal ratio combining.

7. An arrangement according to claim 1 wherein the first group of antenna elements have non-uniform spacings.

8. An arrangement according to claim 1 wherein the second group comprises a single antenna element.

9. An arrangement according to claim 1 wherein the first and second groups of antenna elements are identical spaced apart antenna arrays.

10. An arrangement according to claim 1 wherein the method of combining the downlink signal employs standard beam weights.

11. A method of operating a base station arrangement, the base station arrangement comprising an antenna array, wherein the antenna array comprises a first group of antenna elements and a second group of antenna elements, wherein the first group of elements have a small inter-element spacing of less than 1λ, wherein the second group of antenna elements are spaced from the first group of antenna elements with a large inter-group spacing of greater than 1λ, comprising the steps of:

weighting incoming signals received by the second group of antenna elements from a mobile radio with complex array weights;

deriving directional information from these incoming signals; and generating downlink signals at the first group of antenna elements and steering the downlink signals towards the mobile radio as a function of the derived directional information.

* * * * *